US008428962B1

(12) United States Patent
Brinkley et al.

(10) Patent No.: US 8,428,962 B1
(45) Date of Patent: Apr. 23, 2013

(54) SYSTEMS AND METHODS FOR DETERMINING RETURN ON COMMUNITY INVESTMENT IN HEALTHCARE ACCESS PROGRAMS

(75) Inventors: Joshua P. Brinkley, Webster Groves, MO (US); Connie J. Brooks, Florissant, MO (US); Christopher Felice Palombo, O'Fallon, MO (US); JoAnn A. Webster, Mount Vernon, WA (US)

(73) Assignee: Ascension Health, St. Louis, MO (US)

( * ) Notice: Subject to any disclaimer, the term of this patent is extended or adjusted under 35 U.S.C. 154(b) by 192 days.

(21) Appl. No.: 12/721,660

(22) Filed: Mar. 11, 2010

Related U.S. Application Data

(60) Provisional application No. 61/159,561, filed on Mar. 12, 2009.

(51) Int. Cl.
*G06F 19/00* (2006.01)
*G06Q 10/00* (2006.01)
(52) U.S. Cl.
USPC .................................................. 705/2; 705/3

(58) Field of Classification Search .................. 705/2, 3
See application file for complete search history.

(56) References Cited

U.S. PATENT DOCUMENTS

2006/0026036 A1* 2/2006 Mahmood ........................ 705/2

* cited by examiner

*Primary Examiner* — Robert Morgan
*Assistant Examiner* — Sean K Hunter
(74) *Attorney, Agent, or Firm* — Harness, Dickey & Pierce, P.L.C.

(57) ABSTRACT

A system includes a healthcare server for determining a return on investment (ROI) for a healthcare program of an organization that provides healthcare services to patients. The healthcare server includes an expense determination module, a benefit determination module and a ROI module. The expense determination module determines operating expenses for the healthcare program. The benefit determination module determines benefits of the healthcare program to beneficiaries of the healthcare program. The beneficiaries include the organization, the patients, employers of the patients and a community that is served by the healthcare program. The ROI module determines the ROI for the healthcare program based on the operating expenses and the benefits.

14 Claims, 4 Drawing Sheets

SYSTEMS AND METHODS FOR DETERMINING RETURN ON COMMUNITY INVESTMENT IN HEALTHCARE ACCESS PROGRAMS

CROSS-REFERENCE TO RELATED APPLICATIONS

This application claims the benefit of U.S. Provisional Application No. 61/159,561, filed on Mar. 12, 2009. The entire disclosure of the above application is incorporated herein by reference.

FIELD

The present disclosure relates to healthcare systems, and more particularly to systems and methods for determining return on community investment in healthcare programs.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many people cannot afford health insurance or cannot afford adequate health insurance. People who cannot afford any health insurance are referred to as uninsured people, and people who cannot afford adequate health insurance are referred to as underinsured people. The following discussion applies to both uninsured people and underinsured people. Throughout the present disclosure, the term "uninsured people" will be used to refer to uninsured people, underinsured people and both uninsured and underinsured people.

Many uninsured people do not receive preventive healthcare services. Additionally, many uninsured people do not receive therapeutic healthcare services except perhaps in emergency situations. Emergency services can be more expensive than preventive and non-emergency therapeutic services. Further, prompt preventive and/or therapeutic healthcare can often obviate emergency situations.

Lack of health insurance and lack of access to healthcare services can adversely impact uninsured people, their employers, and the communities they inhabit. For example, uninsured people may be unable to work or may be less productive at work as a result of chronic health issues. Consequently, income levels of uninsured people may fall due to chronic health issues. Additionally, employers with uninsured employees may sustain monetary losses when uninsured employees cannot work or are less productive due to chronic health issues. Consequently, income levels of the employers may fall.

When income levels of uninsured employees and/or their employers fall, tax revenues of government entities may decline. Consequently, the government entities may downsize or eliminate programs that assist uninsured people, thereby further depriving uninsured people of access to healthcare services.

SUMMARY

This section provides a general summary of the disclosure, and is not a comprehensive disclosure of its full scope or all of its features.

A system includes a healthcare server for determining a return on investment (ROI) for a healthcare program of an organization that provides healthcare services to patients. The healthcare server includes an expense determination module, a benefit determination module and a ROI module. The expense determination module determines operating expenses for the healthcare program. The benefit determination module determines benefits of the healthcare program to beneficiaries of the healthcare program. The beneficiaries include the organization, the patients, employers of the patients and a community that is served by the healthcare program. The ROI module determines the ROI for the healthcare program based on the operating expenses and the benefits.

A computer system for determining a return on investment (ROI) for a healthcare program of an organization that provides healthcare services to patients includes a user input module, an expense determination module, a data acquisition module, a benefit determination module and a ROI module. The user input module receives user inputs and outputs expense data for the healthcare program to the expense determination module. The expense determination module receives the expense data and determines operating expenses for the healthcare program based on the expense data. The data acquisition module obtains research data from at least one research database. The benefit determination module receives the research data from the data acquisition module and determines benefits of the healthcare program to beneficiaries of the healthcare program based on the research data. The ROI module determines the ROI for the healthcare program based on the operating expenses and the benefits.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Many healthcare organizations (hereinafter organizations) offer free or reduced-cost healthcare access programs (hereinafter programs) to uninsured people. For example, the programs may include health outreach and education, health promotion and wellness, and safety-net primary care in schools and other community based locations.

The organizations may include hospitals and/or community collaborative organizations that provide the programs based on funding received from various sources, including charitable sources. Many such organizations are not-for-profit organizations. Accordingly, a primary goal of the organizations is to design and implement the programs effectively, economically, and sustainably. Other goals may include determining economic viability of new and ongoing programs and determining whether to start new programs and/or whether to alter or end ongoing programs. Additionally, the organizations strive to improve the quality of life of the patients.

To achieve the primary goal, organizations attempt to minimize costs of the programs and increase benefits of the programs to participants of the programs. The participants may include, but are not limited to, hospitals, patients, employers, and communities. Benefits to hospitals may include reduction in the number of avoidable emergency department visits and avoidable hospitalizations due to the program. Benefits to patients may include a decrease in healthcare costs and increase in earnings due to the program. Benefits to employers may include an increase in employee productivity and/or decrease in employee sick time due to the programs. Benefits to communities may include an increase in tax revenues due to the programs.

More specifically, hospitals may benefit financially by reducing expenses associated with caring for uninsured patients in cases of emergency since the patients enrolled in the programs (enrollees) may be treated in a setting that is more clinically appropriate and less expensive than providing emergency services. For example, the patients may be cared for in an office of a primary care physician participating in the programs instead of in an emergency room. Additionally, hospitalizations that may otherwise occur due to unavailability of adequate care (e.g., preventive care) to uninsured patients may be reduced or prevented under the programs. Accordingly, hospitals may be able to reduce expenses associated with uncompensated care.

Patients enrolled in the program may benefit since the patients are cared for in a setting where care can be provided more appropriately and at less cost compared to options otherwise resorted to by uninsured patients (e.g., emergency care). Thus, the patients may experience reduced healthcare costs. Additionally, care received by patients through the programs may result in fewer sick days and may assist them in increasing their productivity, thereby increasing income from wages for the patients.

Employers may benefit since workers enrolled in the program may receive prompt and appropriate care, thereby missing fewer work days and being more productive at work than when uninsured. Increased productivity of workers and increased income of workers and employers may in turn increase tax based revenues for government entities. The government entities may in turn use the increased tax revenues to start and/or continue initiatives that help the underserved.

The present disclosure relates to systems and methods for determining return on community investment (ROCI, hereinafter ROI) for a program. Generally stated, ROI indicates a quantum of benefit that participants of the program may receive in return for every unit of community investment in the program. For example, if X is the total financial benefit to the participants of the program that costs Y to operate, then ROI for the program may be defined as a percentage of a ratio of X to Y (e.g., ROI=(X/Y)*100%). In other words, for every dollar spent on the program, the ROI is (X/Y) dollars. The greater the ROI, the more financially beneficial the program.

ROI analysis of the present disclosure primarily focuses on three criteria: (1) identifying stakeholders (e.g., participants, beneficiaries, or customers) of the program; (2) determining specific and quantifiable benefits of the program to the identified stakeholders due to the program; and (3) comparing operating expenses to financial benefits of the program.

A measure of ROI can be calculated based on program inputs of operating expenses, participating patients, and benefits to the participants of the program due to the program. The benefits may be determined based on past performance data or based on research data gathered from various national, state, and/or local agencies as explained below.

Using the systems and methods, the organizations can determine in advance whether an enterprise or initiative (i.e., a program) is worth the investment. Additionally, the organizations can determine prospective and/or retrospective impact (i.e., projected performance and/or past performance, respectively) of the programs. The performance of the programs may include financial performance and clinical performance of the programs. Based on the ROI analysis, the organizations can decide effectiveness of programs and whether to start, alter, or end the programs.

In other words, the ROI analysis provides a tool for benchmarking and evaluating programs that can help the organizations in making informed policy decisions about programs. For example, the organizations can decide based on the ROI analysis whether to invest in a program, whether to continue or modify a program, or whether to end a program.

Throughout the disclosure, healthcare access programs are used only as an example of a type of healthcare intervention. The teachings of the present disclosure may be applicable to other types of interventions. For example only, the other types of interventions may include, but are not limited to, Medicaid, prescription drugs and volunteer physician services. Further, the other types of interventions may include a combination of various programs. For example, the interventions may include one or more programs in an overlapping or shared manner.

Figure 1:
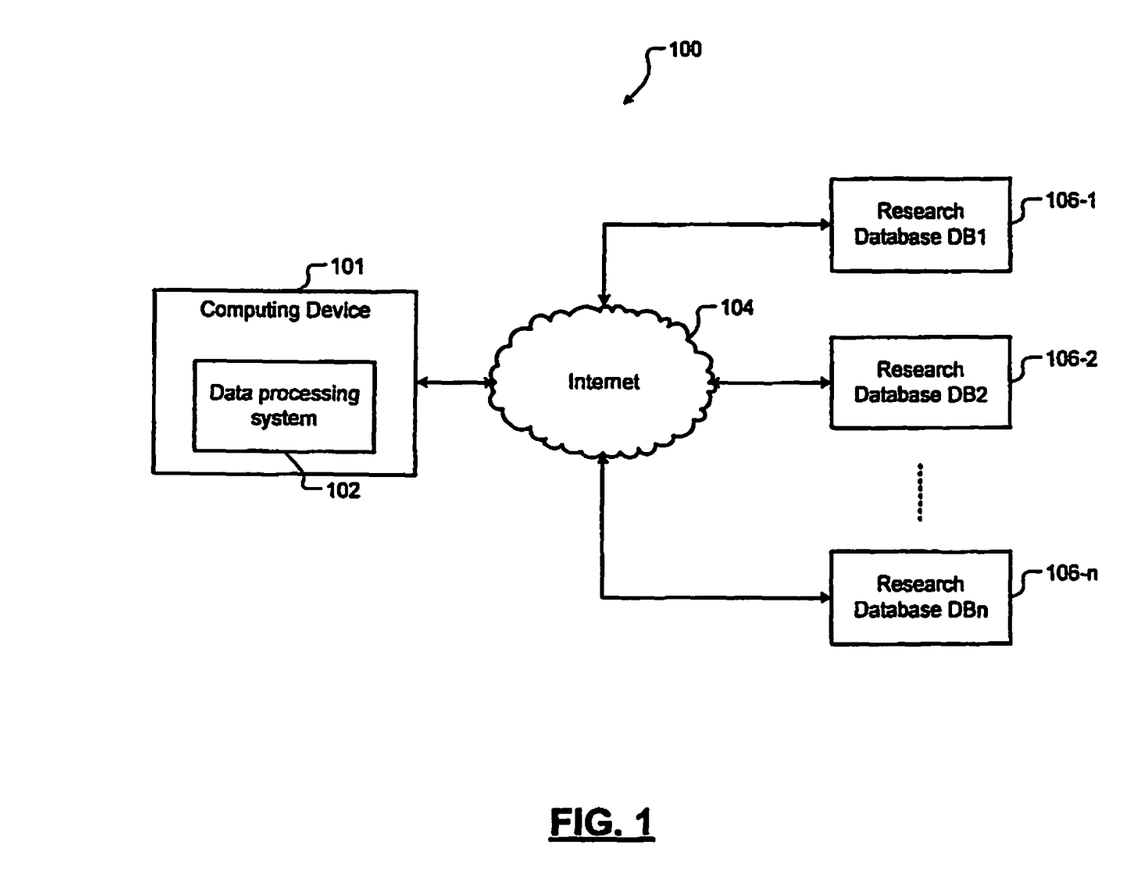
FIG. 1 is a functional block diagram of an exemplary system for determining return on community investment in a healthcare program provided by a healthcare organization.

Referring now to FIG. 1, an exemplary system 100 for determining ROI for programs according to the present disclosure is shown. The system 100 comprises a computing device 101, the Internet 104, and research databases DB1 106-1, DB2 106-2, . . . , and DBn 106-n (collectively research databases 106). The computing device 101 may implement a data processing system (DPS) 102.

The DPS 102 may be implemented in many ways. For example, the computing device 101 may include a host at the organization that may implement the DPS 102. In various embodiments, the computing device 101 may include at least one healthcare server, which may be a special purpose computer or computing device specifically designed and/or programmed to implement the DPS 102. Alternatively or additionally, the computing device 101 may include a network device that implements the DPS 102. The network device may connect to a network comprising one or more servers, the host, and a plurality of client stations. The network may include a local area network (LAN) and/or a wide area network (WAN). The network may be distributed across one or more facilities (i.e., locations) of the organization. The network may communicate with the Internet 104.

The DPS 102 receives tax-related research data, employer-related research data, hospital-related research data, and patient-related research data from the research databases 106. Additionally, the DPS 102 receives inputs (e.g., inputs related to operating expenses and number of enrollees of the program) from the organization. In some implementations, the DPS 102 may receive such inputs or portions thereof from one or more of the research databases 106. Based on the research data, the DPS generates estimates of benefits to the participants of the program. Based on the benefits and the inputs, the DPS 102 generates ROI for the program.

Before describing the DPS 102 in detail, sources of the research data, types of the research data, and utility of the research data are discussed. The focus of the disclosure is on utility of the research data and not on linking to sources for acquiring the research data. The research databases 106 may be located at national, state, and/or local research agencies that collect research data. The research data may include data related to healthcare, employment, and taxpaying status of people. Additionally, the research data may include data related to the impact of healthcare intervention on the status of the people.

The agencies that collect the research data may include government and non-government agencies. For example, the government agencies may include, but are not limited to, departments of health, education, social services, and labor at national, state, and/or local levels. The non-government agencies may include, but are not limited to, community-based agencies such as charitable agencies, religious agencies, medical societies, general health research publications, and/or agencies that help underserved and uninsured people.

The research data may be used to estimate impact of the program on a variety of benefits. For example, from tax-related research data, impact of the program on tax revenues can be estimated. From employer-related research data, impact of the program on employee productivity can be estimated. From hospital-related research data, impact of the program on use of emergency services and frequency of hospitalizations can be estimated. From patient-related research data, decrease in healthcare costs and increase in wages can be estimated.

The research data compiled by one or more of the research databases 106 may comprise the following. For example, the tax-related research data may include state and local tax data from which impact of the program on tax revenues can be estimated. The employer-related research data may include average earnings of employees, number of uninsured people working full time and part time, and number of work hours that are lost due to illness and that can be reduced or eliminated by the program. The employer-related research data can be used to estimate impact of the program on employee productivity.

The hospital-related research data may include average use and average cost of providing emergency services and impact of the program thereon. This hospital-related research data can be used to estimate impact of the program on use of emergency services. Additionally, the hospital-related research data may include number of inpatient admissions, average cost of uninsured hospital admissions, avoidable self pay hospitalizations, and avoidable insured hospitalizations. This hospital-related research data can be used to estimate impact of the program on frequency of hospitalizations.

The patient-related research data may include average use and average cost of using emergency services, number of non-urgent emergency visits, average cost of a physician office visit, and average out-of-pocket payment by patients. From this patient-related research data, impact of the program on cost to patients can be estimated. Additionally, the patient-related research data may include average weekly earnings, impact of health status on earning potential, number of uninsured people in fair or underserved health, and number of people that work full time and part time. From this patient-related research data, impact of the program on income from wages can be estimated.

Additionally, the research data may include information related to consumer price index (CPI). The information related to CPI indicates variations in healthcare costs over a period of time. The information related to CPI can be used to adjust the estimated impact of the program on the benefits. CPI adjustment is used to "make current" or adjust for inflation any dollar amount that is not current.

In some implementations, portions of the research data may be collected and compiled in one or more databases at the organization itself. For example, portions of the hospital-related research data may be routinely logged and compiled at the organization when implementing programs. Accordingly, acquiring the portions of the research data from research databases external to the organization (e.g., research databases 106) may be unnecessary when the research data is available within the organization.

Figure 2:
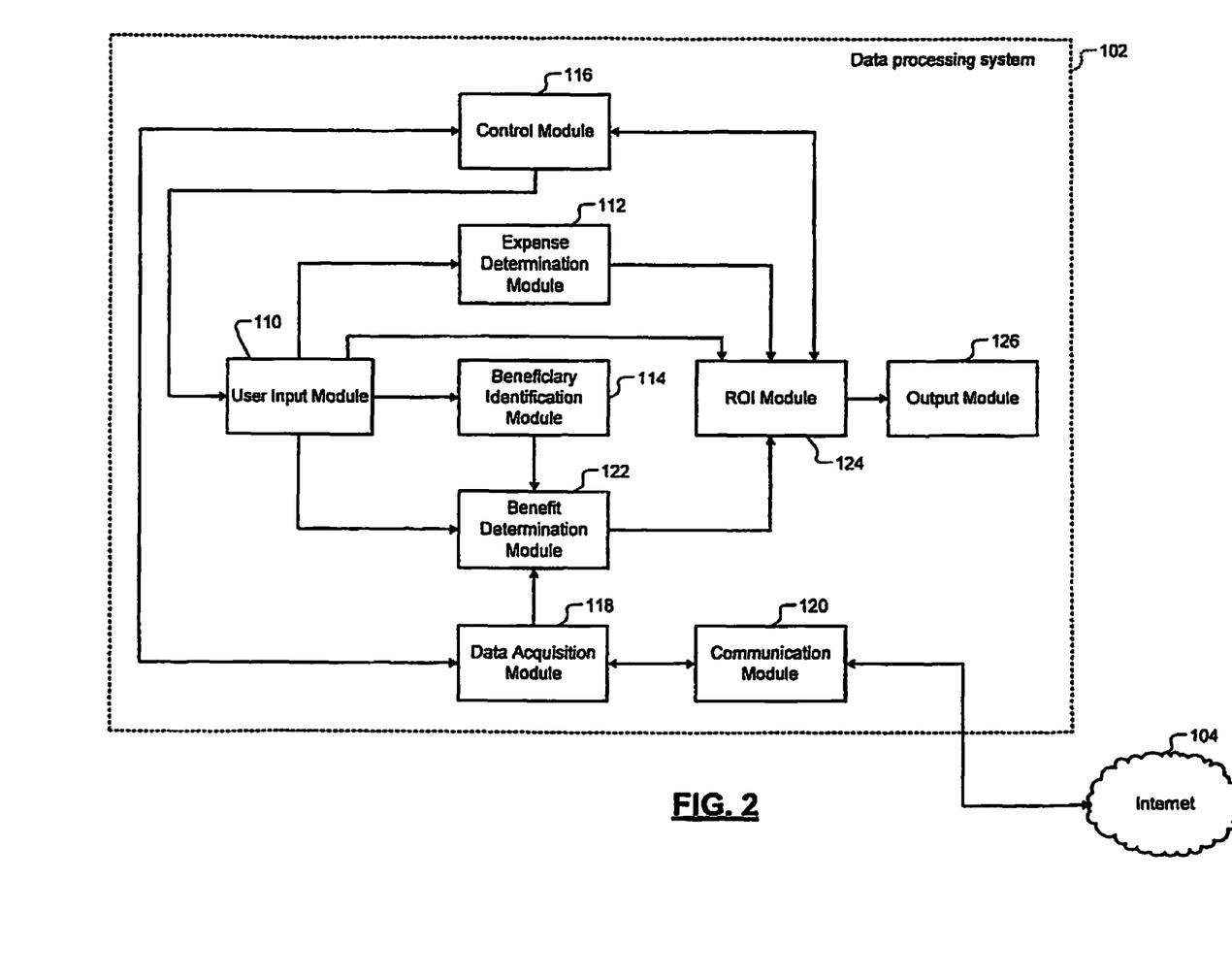
FIG. 2 is a functional block diagram of an exemplary data processing system for determining return on community investment in the healthcare program.

Referring now to FIG. 2, the DPS 102 may comprise a user input module 110, an expense determination module 112, a beneficiary identification module 114, a control module 116, a data acquisition module 118, a communication module 120, a benefit determination module 122, a ROI module 124, and an output module 126. In some implementations, a plurality of the modules may be integrated into a single module or various combinations of modules.

In other implementations, the plurality of modules may be implemented by a computer program executed by one or more processors of the computing device 101. The computer program may reside on a computer readable medium. The computer readable medium may include memory, nonvolatile data storage, and/or other suitable tangible storage mediums. For example only, the computer program may include a spreadsheet program. Additionally, the computing device 101 that implements the DPS 102 may include a mobile computing device. For example only, the mobile computing device may include a laptop, a smart phone, or a personal digital assistant (PDA).

The user input module 110 receives at least program inputs of operating costs of the program and patients served by the program. More specifically, the user input module 110 receives expense data related to operating expenses of the program and beneficiary data related to the beneficiaries of the program via user inputs. For example, the user inputs may be provided by policy makers or by associates of the policy makers of the program. The expense data may include, but is not limited to, salaries of staff and administrative expenses of the organization.

The user input module 110 outputs the expense data to the expense determination module 112. The user input module 110 outputs the beneficiary data to the beneficiary identification module 114. The expense determination module 112 determines the operating expenses of the program based on the expense data. The beneficiary identification module 114 identifies the beneficiaries of the program based on the beneficiary data.

Additionally, the user input module 110 may receive via user inputs the research data compiled at the organization. For example, the research data compiled at the organization may include data related to reduction in emergency service expenses at the organization and data related to reduction in inpatient hospitalization expenses at the organization. The user input module 110 outputs the research data received via user inputs to the benefit determination module 122.

The user input module 110 may also receive a number of enrollees for the program. The user input module 110 may output the number of enrollees to the ROI module 124. In some implementations, the user input module 110 may output the expense data and the research data received via user inputs directly to the ROI module 124.

The control module 116 determines the types of research data that may be acquired from the research databases 106. The data acquisition module 118 acquires the research data from the research databases 106. The data acquisition module 118 accesses the research databases 106 via the communication module 120. The communication module 120 communicates with the research databases 106 via external communication links to the research databases 106 such as the Internet 104.

The data acquisition module 118 outputs the research data acquired from the research databases 106 to the benefit determination module 122. Optionally, the data acquisition module 118 outputs the research data acquired from the research databases 106 to the control module 116. The control module 116 may adjust the research data based on the information related to CPI and may output the research data that is adjusted based on the information related to CPI to data acquisition module 118. The data acquisition module 118, in turn, outputs the research data that is adjusted based on the information related to CPI to the benefit determination module 122.

The benefit determination module 122 analyzes the research data received via user inputs and the research data acquired from the research databases 106. The benefit determination module 122 determines benefits of the program to the beneficiaries. For example, the benefit determination module 122 determines increase in taxable income for the community served by the program. The benefit determination module 122 determines increase in employee productivity due to the program for the employers in the community. The benefit determination module 122 determines decrease in unnecessary use of emergency services due to the program and decrease in unnecessary hospitalizations due to the program at the hospital that administers the program. The benefit determination module 122 determines decrease in healthcare costs and increase in earnings for the patients benefiting from the program.

More specifically, the benefit determination module 122 determines the benefits of the program to the beneficiaries as follows. The benefit determination module 122 determines benefits to the community by estimating increase in taxable income of the enrollees and estimating increase in tax revenue based on the increase in taxable income, the number of enrollees, and the tax rate.

The benefit determination module 122 determines benefits to the employers by estimating cost of employee sick time to the employers with and without the program. Accordingly, the benefit determination module 122 estimates increase in productivity of full time and part time employees. For example, the benefit determination module 122 estimates sick time that can be reduced or eliminated by the program, thereby decreasing the cost of employee sick time to the employers and increasing employee productivity.

The benefit determination module 122 determines benefits to the hospital as follows. The benefit determination module 122 estimates cost of providing emergency services without the program and reduction in the cost by providing the program. For example, cost of emergency visits by uninsured people may be eliminated or reduced by enrolling the uninsured patients in the program and by promptly providing care via primary care physicians under the program instead. The benefit determination module 122 may estimate decrease in unnecessary use of emergency services based on a plurality of factors. The factors may include number of active enrollees, average use of emergency services by the enrollees, median costs of providing emergency services, and impact of the program on the use of emergency services.

Additionally, the benefit determination module 122 may estimate cost of hospitalizing enrollees without the program and reduction in the cost by providing the program. The benefit determination module 122 may estimate decrease in unnecessary hospitalizations based on a plurality of factors. The factors may include number of active enrollees, number of inpatient admissions, average cost of an uninsured avoidable hospital stay, number of avoidable self pay hospitalizations, and avoidable insured hospitalizations.

The benefit determination module 122 determines benefits to the patients as follows. The benefit determination module 122 estimates income of enrollees without access to the program, income of enrollees whose health status improved due to participation in the program, and income of enrollees whose health status remains unchanged despite participation in the program. The benefit determination module 122 may estimate the benefit to the patients based on a plurality of factors. The factors may include impact of health status on earning potential of the enrollees and income of the enrollees based on the health status. The enrollees may include full time and part time workers.

Thus, the benefit determination module 122 determines the benefits of the program to the identified beneficiaries (i.e., participants or customers of the program). The benefit determination module 122 outputs the benefits to the ROI module 124.

The ROI module 124 determines ROI for the program as follows. The ROI module 124 receives the operating expenses and the number of enrollees for the program via user inputs. Optionally, the ROI module 124 receives via user inputs the reduction in emergency services expenses and the reduction in inpatient hospitalization expenses due to the program. Additionally, the ROI module 124 receives the benefits to the identified beneficiaries of the program from the benefit determination module 122. The ROI module 124 generates ROI for the program based on at least the operating expenses of the program, the number of enrollees for the program, and the benefits to the identified beneficiaries of the program.

The ROI module 124 may express ROI as a percentage of a ratio of the benefits of the program to the operating expenses of the program. For example, if the benefits of the program to the participants are X, and the operating expenses of the program are Y, the ROI module 124 expresses ROI as ROI=[(X/Y)*100%]. Generally, ROI indicates to the policy makers that for every dollar spent on the program, ROI for the program is (X/Y) dollars. Typically, ROI is greater than zero. The greater the ROI, the more beneficial and desirable the program.

Following is an example of a typical ROI analysis according to the present disclosure. The example is only a hypothetical illustration used to aid understanding. Actual results may vary depending on variations in one or more factors of the ROI analysis. The factors may include, but are not limited to, the benefit data, which may vary depending on variations in the research data, for example.

In the example, the operating expenses of the program with 4000 enrollees may be $200,000. The benefits of the program may be as follows: Benefits to community=$100,000; benefits to employers=$200,000; benefits to hospital=$200,000; and benefits to patients $1,200,000. Thus, total program benefits may be $1,700,000.

To determine ROI for the program, the policy makers of the program may input $200,000 as the operating expenses of the program and 4000 as the number of patients of the program. Based on the inputs and the research data, the ROI module 124 may generate ROI for the program as follows:

ROI may be formulated as ROI=[(Total Benefits)/(Operating Expenses)]*100%. Thus, using the exemplary numbers from the above example, ROI=[1,700,000/200,000] *100%=850%. The ROI module 124 may output ROI as 8.5 or 850%. In other words, for every dollar invested in the program, the return on community investment for the program is 8.5 dollars. In addition, the ROI module 124 may output the benefits to each stakeholder of the program and/or the total benefits to the stakeholders of the program.

The ROI module 124 may output ROI and the benefits to the output module 126. The output module 126 may include visual and/or audio indicators that indicate ROI and the benefits to the policy makers of the program. For example, the output module 126 may include a display, a speaker and/or a printer that provides the visual and/or audio indication of ROI and the benefits to the policy makers.

The policy makers may decide based on ROI whether to undertake the program when the program is newly proposed. For example, the policy makers may decide to undertake the newly proposed program when ROI for the program is greater than or equal to a threshold value. For example, the threshold value may be 8. That is, for every dollar spent on the program, the policy makers may desire that ROI may be at least 8.

Conversely, the policy makers may decide based on ROI whether to end or alter the program when the program is already implemented. For example, when ROI is below the threshold value, the policy makers may decide to abandon the program. Alternatively, the policy makers may find ways to decrease operating expenses of the program by cutting costs to improve ROI of the program and continue an ongoing program instead of ending the program. Subsequently, the policy makers may periodically monitor ROI and decide whether to end or to continue the program.

Figure 3:
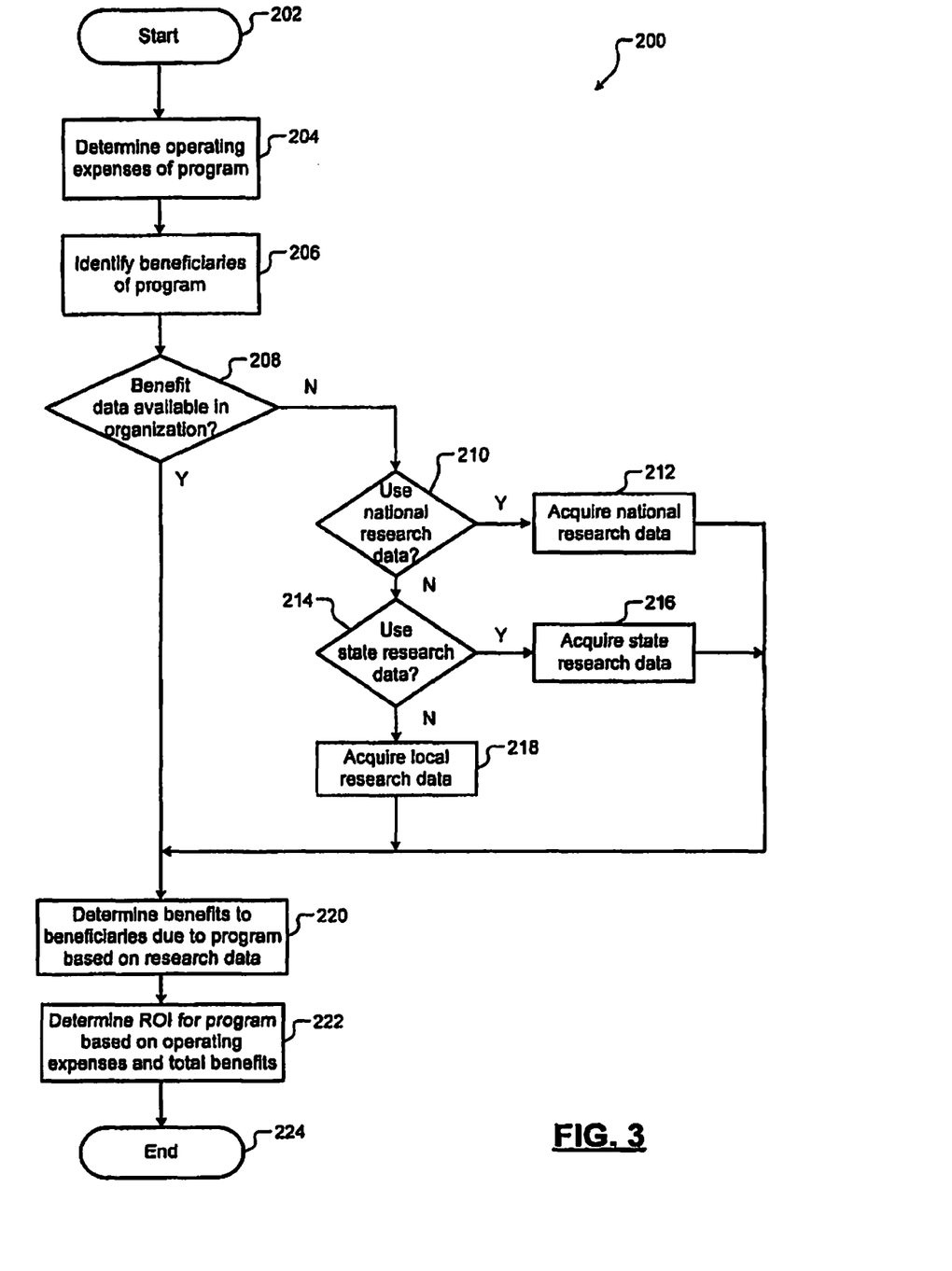
FIG. 3 is a flowchart for an exemplary method for determining return on community investment in the healthcare program.

Referring now to FIG. 3, an exemplary method 200 for determining ROI for programs is shown. For example only, one or more of the modules of the DPS 102 may provide control for the method 200. Control begins in step 202. Control determines operating expenses of the program in step 204. Control identifies beneficiaries of the program in step 206. Control determines in step 208 if research data for determining benefits of the program to the beneficiaries is available in the organization.

If the research data is unavailable in the organization, control determines in step 210 whether to use the research data from a national research database. Control acquires the research data from the national research database in step 212 when control selects using the research data from the national research database. Control determines in step 214 whether to use the research data from a state research database when control determines not to use the research data from the national research database. Control acquires the research data from the state research database in step 216 when control selects using the research data from the state research database. Control acquires the research data from a local research database in step 218 when control determines not to use the research data from the state research database.

In most implementations, control may use the research data from a combination of the national, state, and/or local research databases. Moreover, the research data obtained from the local research databases may be more desirable and credible than the research data available from other research databases. Additionally, the research data may be acquired ad hoc and not concurrently by linking to the research databases while determining ROI.

Control determines benefits to the beneficiaries of the program in step 220 based on the research data that is available in the organization and/or the research data that is optionally acquired from at least one of the national, state, and local research databases. Control determines ROI for the program in step 222 based on the operating expenses and the benefits to the beneficiaries. Control ends in step 224.

Figure 4:
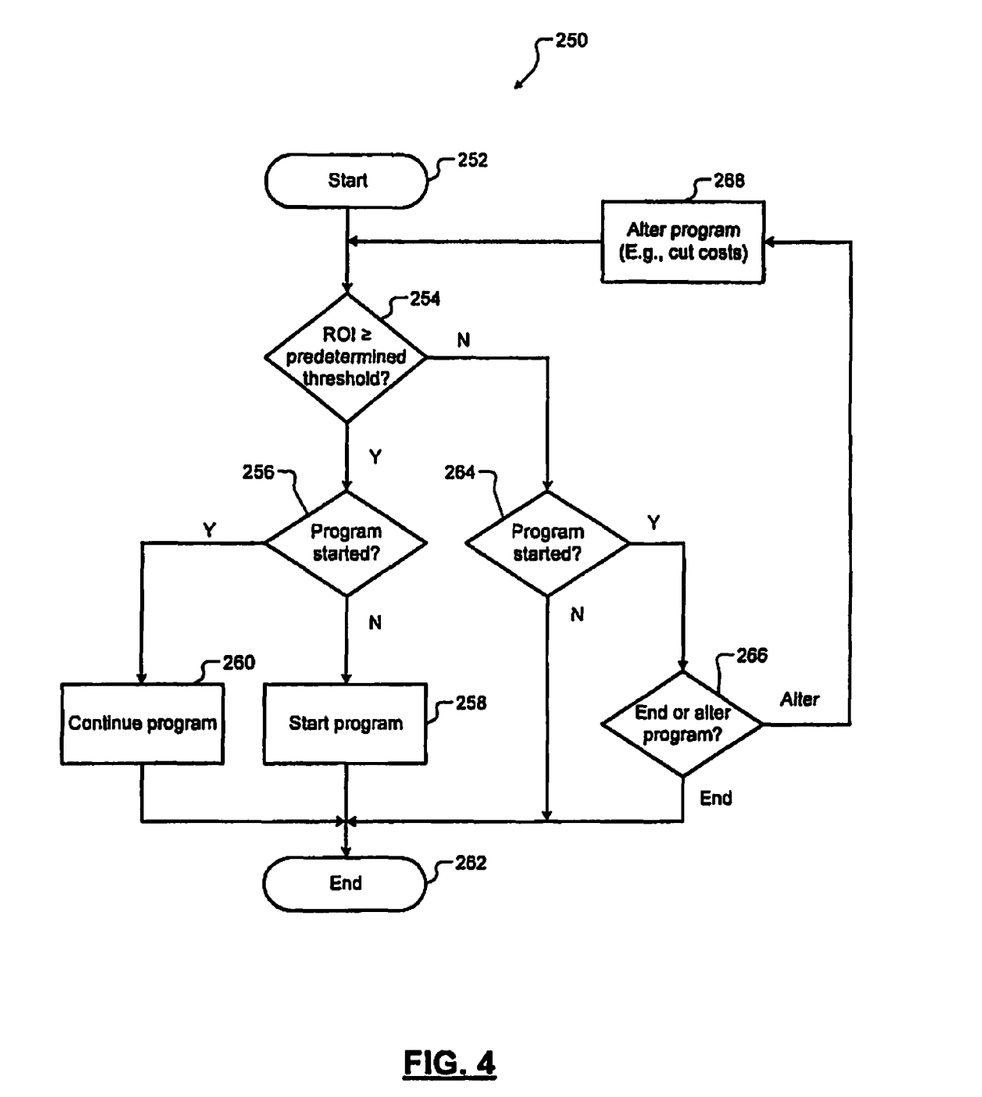
FIG. 4 is a flowchart for an exemplary method for making policy decisions related to the healthcare program based on the return on community investment in the healthcare program.

Referring now to FIG. 4, an exemplary method 250 for making policy decisions related to the program based on ROI for the program is shown. The method 250 begins in step 252. The policy makers determine in step 254 whether ROI for the program is greater than or equal to the threshold value. When ROI for the program is greater than or equal to the threshold value, the policy makers determine in step 256 if the program is already implemented. The policy makers may decide to start the program in step 258 if the program is not already implemented. The policy makers may decide to continue the program in step 260 if the program is already implemented. At the end of steps 258 or 260, the method 250 ends in step 262.

Conversely, when ROI for the program is less than the threshold value, the policy makers determine in step 264 if the program is already implemented. The method 250 ends in step 262 if the program is not already implemented. If the program is already implemented, the policy makers may determine in step 266 whether to end or alter the program in step 266. The method 250 ends in step 262 if the policy makers decide to end the program. If the policy makers decide to alter the program, the policy makers may alter the program (e.g., take measures to reduce costs or operating expenses of the program) in step 268. Thereafter, steps starting from step 254 are repeated.

Further areas of applicability of the present disclosure will become apparent from the detailed description and the drawings. The detailed description and specific examples are intended for purposes of illustration only and are not intended to limit the scope of the disclosure.

The broad teachings of the disclosure can be implemented in a variety of forms. Therefore, while this disclosure includes particular examples, the true scope of the disclosure should not be so limited since other modifications will become apparent upon a study of the drawings and the specification.

What is claimed is:

1. A system, comprising:
   a healthcare server that determines a return on community investment (ROCI) for a healthcare program of an organization providing healthcare services to patients in a community,
   wherein the ROCI indicates a quantum of benefit that beneficiaries of the healthcare program receive in return for every unit of community investment in the healthcare program,
   wherein the beneficiaries include the organization and the community served by the healthcare program, and wherein the community includes the patients and employers of the patients, the healthcare server including:
an expense determination module that determines operating expenses for the healthcare program;
a data acquisition module that obtains research data from at least one research database, wherein the research data includes tax-related research data, employer-related research data, employee-related research data, hospital-related research data, and patient-related research data, and wherein the data acquisition module obtains the research data from (i) a local-level agency if the research data is unavailable within the organization, (ii) a state-level agency if the research data is unavailable from the local-level agency, and (iii) a national-level agency if the research data is unavailable from the state-level agency;
a benefit determination module that determines benefits of the healthcare program to the beneficiaries of the healthcare program based on at least one of past performance data of the healthcare program and the research data, wherein the benefits include decreased visits by the patients to the organization, reduced healthcare expense for the patients, increased earnings for the patients, increased employee productivity for the employers of the patients, and increased tax revenues for the community served by the healthcare program; and
a ROI module that determines the ROCI for the healthcare program based on the operating expenses for the healthcare program and the benefits to the beneficiaries of the healthcare program,
wherein the ROCI is a percentage of a ratio of the benefits to the beneficiaries of the healthcare program and the operating expenses for the healthcare program, and
wherein the ROCI allows the organization to benchmark and evaluate a plurality of healthcare programs and, based on the benchmarking and evaluation, to determine (i) projected financial and clinical performance of the healthcare program, (ii) whether to start the healthcare program, (iii) past financial and clinical performance of the healthcare program, and (iv) whether to alter or end the healthcare program.

2. The system of claim 1, wherein the healthcare server further comprises a user input module that outputs expense data for the healthcare program to the expense determination module and wherein the operating expenses for the healthcare program are based on the expense data.

3. The system of claim 1, wherein the healthcare server further comprises a beneficiary identification module that identifies the beneficiaries of the healthcare program based on beneficiary data from user inputs to determine beneficiary identification data and that outputs the beneficiary identification data to the benefit determination module, wherein the benefits of the healthcare program are based on the beneficiary identification data.

4. The system of claim 1, wherein the data acquisition module is in communication with the at least one research database through a communication module.

5. The system of claim 1, wherein the healthcare server further comprises a control module that adjusts the research data based on consumer price index data to determine adjusted research data and that outputs the adjusted research data to the data acquisition module, wherein the benefits of the healthcare program are based on the adjusted research data.

6. The system of claim 1, wherein the healthcare server further comprises an output module that outputs the ROI for the healthcare program.

7. The system of claim 6, wherein the output module includes at least one of a display, a speaker and a printer.

8. A computer system configured to determine a return on community investment (ROCI) for a healthcare program of an organization providing healthcare services to patients in a community, the computer system comprising:
a user input module that receives user inputs and that outputs expense data for the healthcare program;
an expense determination module that receives the expense data and that determines operating expenses for the healthcare program based on the expense data;
a data acquisition module that obtains research data from at least one research database, wherein the research data includes tax-related research data, employer-related research data, employee-related research data, hospital-related research data, and patient-related research data, and wherein the data acquisition module obtains the research data from (i) a local-level agency if the research data is unavailable within the organization, (ii) a state-level agency if the research data is unavailable from the local-level agency, and (iii) a national-level agency if the research data is unavailable from the state-level agency;
a benefit determination module that receives the research data from the data acquisition module and that determines benefits of the healthcare program to beneficiaries of the healthcare program based on at least one of past performance of the healthcare program and the research data, wherein the beneficiaries include the organization and the community served by the healthcare program, wherein the community includes the patients and employers of the patients, and wherein the benefits include decreased visits by the patients to the organization, reduced healthcare expense for the patients, increased earnings for the patients, increased employee productivity for the employers of the patients, and increased tax revenues for the community served by the healthcare program; and
a ROI module that determines the ROCI for the healthcare program based on the operating expenses for the healthcare program and the benefits to the beneficiaries of the healthcare program,
wherein the ROCI indicates a quantum of benefit that the beneficiaries of the healthcare program receive in return for every unit of community investment in the healthcare program,
wherein the ROCI is a percentage of a ratio of the benefits to the beneficiaries of the healthcare program and the operating expenses for the healthcare program, and
wherein the ROI allows the organization to benchmark and evaluate a plurality of healthcare programs and, based on the benchmarking and evaluation, to determine (i) projected financial and clinical performance of the healthcare program, (ii) whether to start the healthcare program, (iii) past financial and clinical performance of the healthcare program, and (iv) whether to alter or end the healthcare program.

9. The computer system of claim 8, further comprising a beneficiary identification module that identifies the beneficiaries of the healthcare program based on beneficiary data from user inputs to determine beneficiary identification data and outputs the beneficiary identification data to the benefit determination module, wherein the benefits of the healthcare program are based on the beneficiary identification data.

10. The computer system of claim 8, wherein the data acquisition module is in communication with the at least one research database through a communication module.

11. The computer system of claim 8, further comprising a control module that adjusts the research data based on consumer price index data to determine adjusted research data and that outputs the adjusted research data to the data acquisition module, wherein the benefits of the healthcare program are based on the adjusted research data.

12. The computer system of claim 8, further comprising an output module that outputs the ROI for the healthcare program.

13. The computer system of claim 12, wherein the output module includes at least one of a display, a speaker and a printer.

14. The computer system of claim 8, further comprising a special purpose computing device that includes the user input module, the expense determination module, the data acquisition module, the benefit determination module, and the ROI module.

* * * * *